Figures 1, 2:
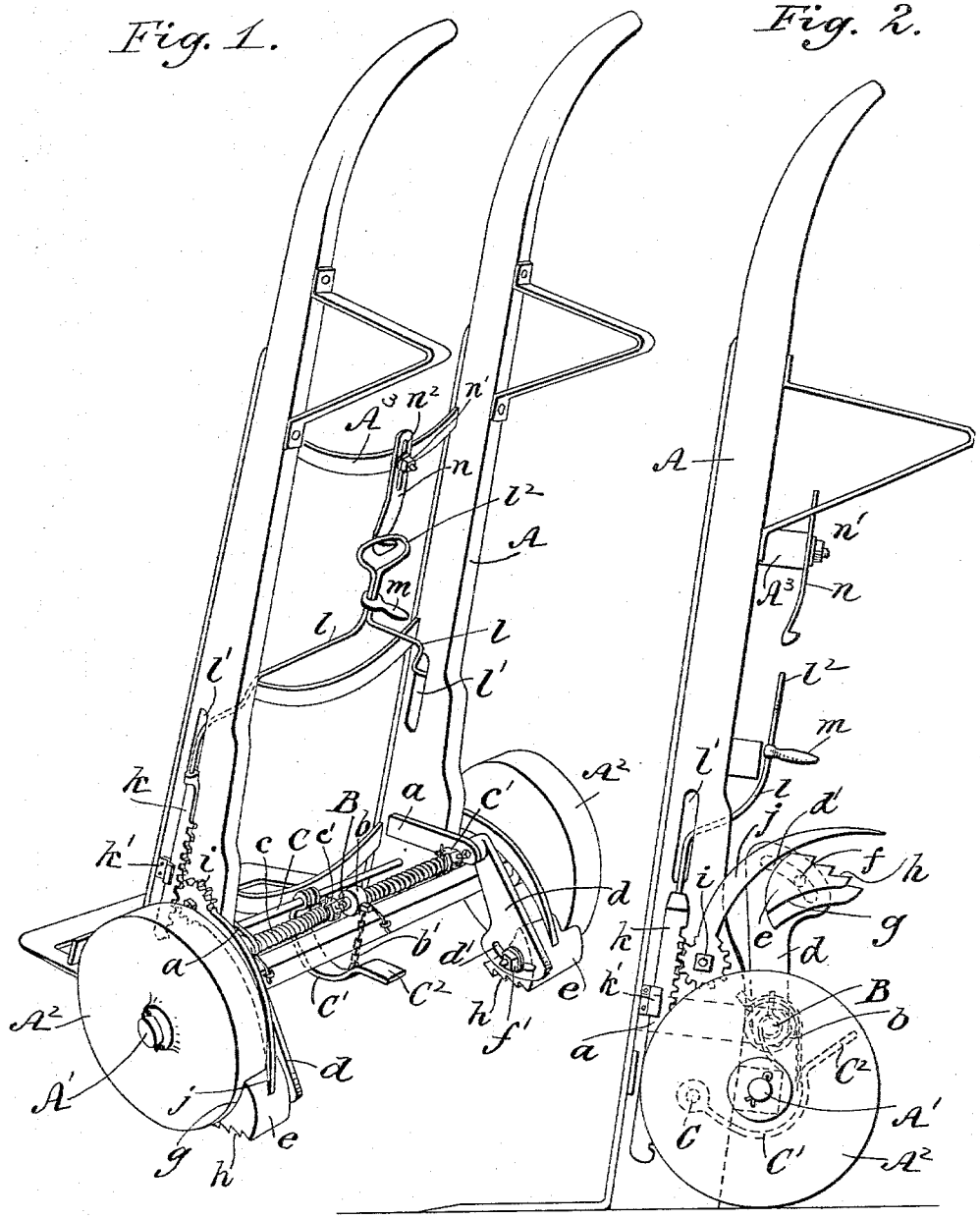

(No Model.)

H. L. HAZEN.
TRUCK.

No. 531,997. Patented Jan. 1, 1895.

WITNESSES
INVENTOR
Henry L. Hazen
BY Edgar Tate & Co
ATTORNEYS

UNITED STATES PATENT OFFICE.

HENRY L. HAZEN, OF PATCHOGUE, NEW YORK.

TRUCK.

SPECIFICATION forming part of Letters Patent No. 531,997, dated January 1, 1895.

Application filed June 2, 1894. Serial No. 513,225. (No model.)

*To all whom it may concern:*

Be it known that I, HENRY L. HAZEN, a citizen of the United States, and a resident of Patchogue, in the county of Suffolk and State of New York, have invented certain new and useful Improvements in Trucks, of which the following is a specification.

This invention relates to hand trucks for carting cases, trunks, and similar articles, and has for its object to provide means for instantaneously braking the wheels of such trucks by the movement of the foot, and also to provide an attachment whereby the said brakes may after the application thereof be locked in position.

This invention, which is an improvement upon that for which I have already made application for Letters Patent of the United States, which said application bears date the 24th day of February, 1894, Serial No. 501,333, consists in the novel and improved construction and arrangement of parts hereinafter fully described.

In the accompanying drawings, forming part of this specification, in which like letters of reference designate corresponding parts throughout, Figure 1 is a perspective view of a truck embodying my invention, the brakes being applied to the wheels thereof and locked in such position. Fig. 2 is a side elevation of the same with the brakes released.

In the present invention, I secure to the inner side of the truck-frame A sockets $a$, in which is journaled a shaft B, having formed upon the center thereof a circular shoulder or collar $b$ having a lug $b^2$ projecting therefrom. Surrounding this shaft on either side of the lug are springs $c$ secured to the axle A' and to the shaft by means of adjustable nuts $c'$. Rearward of the shaft B is a bar C, mounted in each side of the truck-frame A, and having journaled thereon a curved arm C' which passes below the axle A', and has at the forward end thereof and preferably formed integrally therewith, the pedal $C^2$. This pedal is secured to the lug $b^2$ by means of a short chain or other connection $b'$. Mounted on the shaft at each end thereof are the wings $d$, of approximately triangular shape, and having in the free or broadest end thereof slots $d'$. At the outer side of each of these wings are the brake shoes $e$ having thereon one or more studs $f$ passing through and working in the grooves $d'$, the said studs having a nut $d^2$ upon the end thereof. These brake-shoes are curved at the inside to correspond with the circumference of the wheels $A^2$, and in common with the whole of the device are preferably of wrought or cast iron or other metal, and may have upon their inner sides a covering of elastic or flexible material $g$. The said brake-shoes are provided upon the bottom with teeth or corrugations $h$.

Upon the outer sides of the truck-frame are journaled pinions $i$, each having mounted thereon a segmental clamping arm or lever $j$. In front of the pinions $i$ are secured sliding ratchet bars $k$, held in engagement with the said pinions by means of the guides or shoulders $k'$, and branching off from the top of these ratchet bars are arms $l$ passing through slots $l'$ in the sides of the truck-frame, the said arms approaching each other and joining at the center of the truck in the form of a loop $l^2$, beneath which is mounted a handle $m$. Depending from the cross bar $A^3$ of the truck, immediately above the loop, is a hooked bar $n$ with the end of which the loop is adapted to engage, the said bar being secured by means of a bolt $n'$ passing through an elongated slot $n^2$ in the said bar, whereby the height of the same is adjustable.

The operation of the device will be clearly understood from the foregoing description, taken in connection with the accompanying drawings. The pedal $C^2$ may be depressed by the foot of the expressman or operator of the truck without the said foot being completely raised from the floor, and as this is accomplished the wings $d$ are lowered and the brake-shoes $e$ thereby brought into engagement with the wheels, preventing any further movement of the same, and thus effectually stopping the truck. The under or corrugated surface of the brake-shoes also impinges against the ground or surface on which the truck is being wheeled to reinforce the braking action of the shoes upon the wheels. The shoes having been thus depressed, the arms $l$ are raised by means of the handle $m$ or by the loop $l^2$ and the said loop rested upon the hooked end of the bar $n$. Through this movement the ratchet bars $k$ are likewise raised, thereby turning the pinions $i$ and forcing the arms $j$ downwardly to clamp the brake-shoes $e$ in place. The wheels of the truck will then be prevented from moving, while at the same time the truck frame may be moved slightly toward or away from the operator irrespective of the wheels by reason of the length of the slots $d'$ in the wings $d$, the said wheels being immobile and serving as bearings, while the truck-frame and the axle $a'$ to which it is secured have the effect of being journaled therein.

The advantages of the present device rest mainly in the improvement in construction of the operating pedal, whereby the same may be actuated by the toe of the foot without raising the heel from the ground; as also in the attachment for locking the brake-shoes when once depressed. Furthermore, the tension of the springs $c$, which maintain the brakes normally above the wheels and in releasement therefrom, may be regulated by adjusting the nuts $c'$. The hooked bar $n$ may also be adjusted by means of the nut $n'$ in order that the clamps $j$ may be held firmly down upon the shoes.

Having thus fully described my invention, what I claim as new, and desire to secure by Letters Patent, is—

1. In a brake attachment for trucks, the combination with one or more shoes supported adjacent to the wheels of the truck, and a pedal connecting with the said shoes, and adapted when depressed to force the same against the wheels of the truck, of one or more clamps pivoted above the shoes, and adapted to bear thereon when the same are in the locked position, and means for depressing the said clamps, substantially as shown and described.

2. In a brake attachment for trucks, the combination, with a shaft journaled near the wheels thereof, one or more shoes thereon, and a pedal connecting with the shaft and adapted when depressed to force the shoes into engagement with the wheels, of one or more clamps pivoted above the shoes and adapted to bear thereon when the same are in the locked position, and a handle having connection with the clamps to depress the same, substantially as shown and described.

3. A brake attachment for trucks, comprising a shaft journaled near the wheels of the truck, one or more shoes thereon, a projecting lug upon the shaft, a pedal journaled beneath the same, and a chain connecting the pedal and the lug, whereby depression of the said pedal will force the shoes into engagement with the wheels, substantially as shown and described.

4. A brake attachment for trucks, comprising a shaft journaled near the wheels of the truck shoes arranged upon the shaft at either side thereof, a spring surrounding the shaft to maintain the shoes normally raised out of engagement with the wheels, a lug projecting from the shaft, a pedal journaled beneath the same, and a chain connecting the said pedal and the lug, substantially as shown and described.

5. A brake attachment for trucks, comprising a shaft journaled near the wheels of the truck, one or more shoes supported thereon and adapted when depressed to engage with the wheels, a pedal journaled beneath the same, a chain connecting the pedal and the shaft whereby the depression of the pedal will bring the shoes into engagement with the wheels, one or more clamps upon the side of the truck, adapted to bear upon the shoes when they are in the locked position, an arm adapted to depress the said clamps, and a hook for securing the said arm when the clamps are locked, substantially as shown and described.

6. A brake attachment for trucks, consisting of a shaft journaled near the wheels thereof and having a projecting lug upon the center thereof, a spring surrounding the said shaft, a pedal journaled beneath the same and connecting to the lug by a chain, shoes at either side of the shaft, clamps journaled upon each side of the truck, an arm adapted when raised to lock the said clamps upon the shoes, a loop upon the end of the said arm, and a hook above the same, substantially as shown and described.

7. A brake attachment for trucks, consisting of a shaft journaled near the wheels thereof and having a projecting lug thereon, wings at each side of the same having grooves therein, shoes mounted upon the wings, a spring surrounding the shaft to maintain the shoes normally out of engagement with the wheels, a pedal journaled beneath the shaft and connecting to the lug, pinions journaled at each side of the truck and having clamping arms secured thereto, ratchet bars engaging with the said pinions, an arm adapted to raise the said bars, and a hook adapted to engage with the said arm substantially as shown and described.

In testimony that I claim the foregoing as my invention I have signed my name, in presence of two witnesses, this 21st day of May, 1894.

HENRY L. HAZEN.

Witnesses:
GEO. D. GERARD,
C. GUNTHER ROSE.